UNITED STATES PATENT OFFICE.

EDWARD RENAUD, OF WASHINGTON, DISTRICT OF COLUMBIA.

IMPROVEMENT IN WELDING COPPER.

Specification forming part of Letters Patent No. 145,686, dated December 16, 1873; application filed June 27, 1872.

*To all whom it may concern:*

Be it known that I, EDWARD RENAUD, of the city of Washington and District of Columbia, have invented certain new and useful Improvements in the Welding of Copper; and I do hereby declare that the following is a full and exact description thereof.

My invention consists in welding copper by heating it first with a cleaning compound—such as borax, or equivalent salt—which will remove the scale and protect the copper from further oxidation, and then applying an anhydrous flux, which will easily flow out as the joints between the pieces of copper are brought together by hammering, pressing, or rolling. I find that the mineral known as cryolite or the double fluoride of sodium and aluminum answers the purpose; but any other anhydrous fluoride or other similar salt that will form, when heated, a liquid flux, and will not give out any oxygen to form a scale on the copper, will answer the purpose.

In the welding of copper, I take the two ends or edges of copper to be joined, and hammer them out so as to form the "lap." The pieces are then put in the fire and heated, dipped in powdered borax to clean the surfaces, and returned to the fire and heated a second time. After the second heat the pieces are dipped quickly into powdered cryolite, or any other of the fluorides which may be preferred, and hammered together on the anvil, when a perfect and homogeneous weld will be effected. It may be necessary, in some instances, to return the metal to the fire a third time, and after dipping it in the welding-flux; or the latter may be kept for use in a fused condition in a convenient bath on the forge.

The action of these compounds containing fluorine is almost wholly mechanical. Taking, as an example, the fluoride of aluminum and sodium we find it to possess the following properties: It contains no water of crystallization, which would furnish oxygen to the surface of the heated metal, and thus interfere materially with the integrity of the weld; it fuses at an extremely low temperature, a temperature below that of the fusing-point of any of the metals; and, when in a melted state, it spreads out in an extremely thin film of translucent glass. This film rests upon and spreads over the heated surfaces of the metal, effectually excludes all oxygen, and enables the clean surfaces to be welded together by the blows of the hammer, which drive out the flux still in a molten state.

I am aware that Messrs. Christian L. Schurr and Wm. G. Rehbein, of Baltimore, Maryland, have secured patents for new processes for welding copper, viz., Patent No. 121,009, dated November 14, 1871, in which they use biborate of soda to clean the copper at first heat, and after heating the second time dip it in common salt and human fæces; also, Patent No. 123,296, dated January 30, 1872, in which they use biborate of soda to clean the copper at first heat, and after heating the second time dip it in common salt alone, claiming further, in this second patent, "chlorine gas or the basic salts which contain it." The processes as set forth in the two patents cited I hereby disclaim. I am also aware that ordinary table-salt (NaCl) has been used in conjunction with borax, ($NaO2B O_3 + 10HO$,) for welding copper, and hence I disclaim that.

Having thus described my invention, what I claim as new, and desire to secure by Letters Patent, is—

The process herein described for welding copper, consisting in bringing together the heated and cleaned surfaces to be united, covered with cryolite, or other similar anhydrous flux, and uniting by hammering, rolling, or pressing, substantially as set forth.

EDWARD RENAUD.

Witnesses:
R. K. EVANS,
EDM. F. BROWN.